United States Patent [19]
Lawrence et al.

[11] Patent Number: 5,655,642
[45] Date of Patent: Aug. 12, 1997

[54] IDLER ROLL FOR USE IN BELT CONVEYOR SYSTEMS

[75] Inventors: Scott P. Lawrence, Tupelo; Charles F. East, Van Vleet; Samuel Clark Richey, Baldwin, all of Miss.

[73] Assignee: FMC Corporation, Chicago, Ill.

[21] Appl. No.: 446,376

[22] Filed: May 22, 1995

[51] Int. Cl.⁶ ............................................ B65G 13/00
[52] U.S. Cl. ............................................ 193/37
[58] Field of Search ............................ 198/825, 824, 198/823; 193/35 R, 37

[56] References Cited

U.S. PATENT DOCUMENTS

| | | | |
|---|---|---|---|
| 2,135,175 | 11/1938 | Fallon | 193/37 X |
| 2,650,603 | 9/1953 | Howes | 193/37 X |
| 3,202,258 | 8/1965 | Isaksen | 193/37 X |
| 3,550,758 | 12/1970 | Stalker | 193/37 X |
| 3,559,782 | 2/1971 | Lesley | 193/37 |
| 4,496,257 | 1/1985 | Habelt et al. | 193/37 X |
| 5,048,661 | 9/1991 | Toye | 193/37 X |
| 5,372,230 | 12/1994 | Niklewski | 193/37 |
| 5,381,887 | 1/1995 | Emmons | 193/37 X |

FOREIGN PATENT DOCUMENTS

| | | | |
|---|---|---|---|
| 1296065 | 5/1961 | France | 193/37 |
| 2020195 | 11/1971 | Germany | 193/37 |

OTHER PUBLICATIONS

*EXALON Polyethylene Replacement Idler Rolls* (not dated) FMC Corporation, Material Handling Equipment Division, Homer City, PA (brochure).

*Link Belt –The Clear Advantage* (not dated) FMC Corporation, Conveyor Equipment Division, Tupelo, Mississippi (brochure).

*Primary Examiner*—James R. Bidwell
*Attorney, Agent, or Firm*—Michael C. Penn

[57] ABSTRACT

There is provided an idler roll for use in belt conveyor systems comprising a shaft and at least two modular sections disposed adjacent to one another surrounding the shaft, the at least two modular sections varying in thickness as measured along an axis of the shaft. There is also provided an idler roll for use in belt conveyor systems comprising a shaft and a molded polymer coating disposed around the shaft, wherein the coating is at least partially tapered in cross section at each end of the idler roll. There is further provided a belt conveyor system for handling bulk material employing idler rolls.

12 Claims, 4 Drawing Sheets

U.S. Patent    Aug. 12, 1997    Sheet 1 of 4    5,655,642
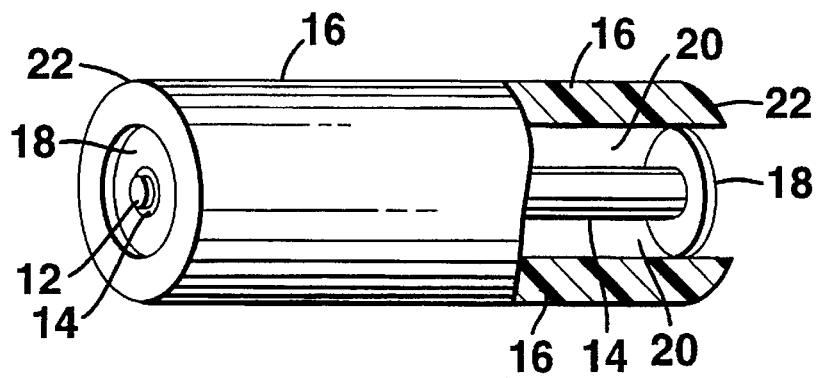
FIG_1
PRIOR ART
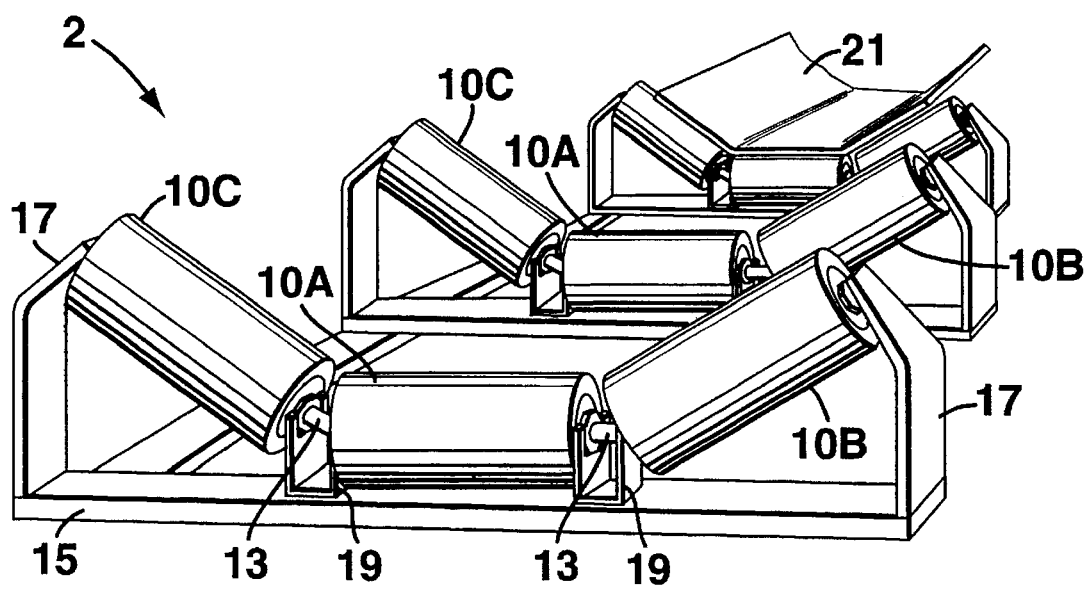
FIG_2
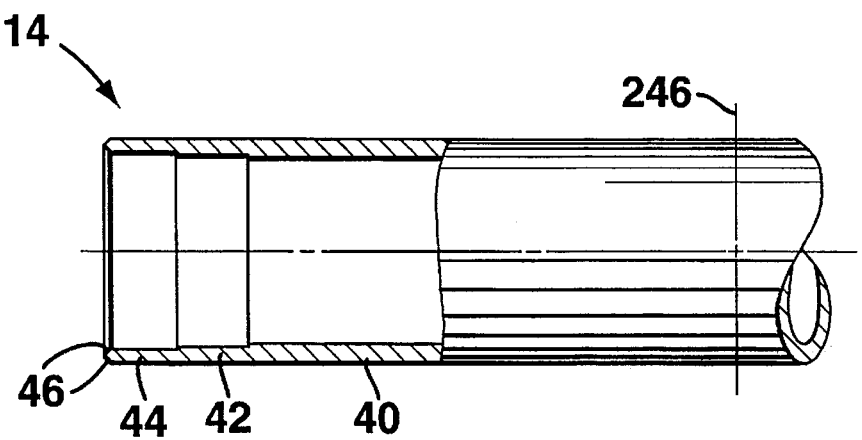
FIG_10

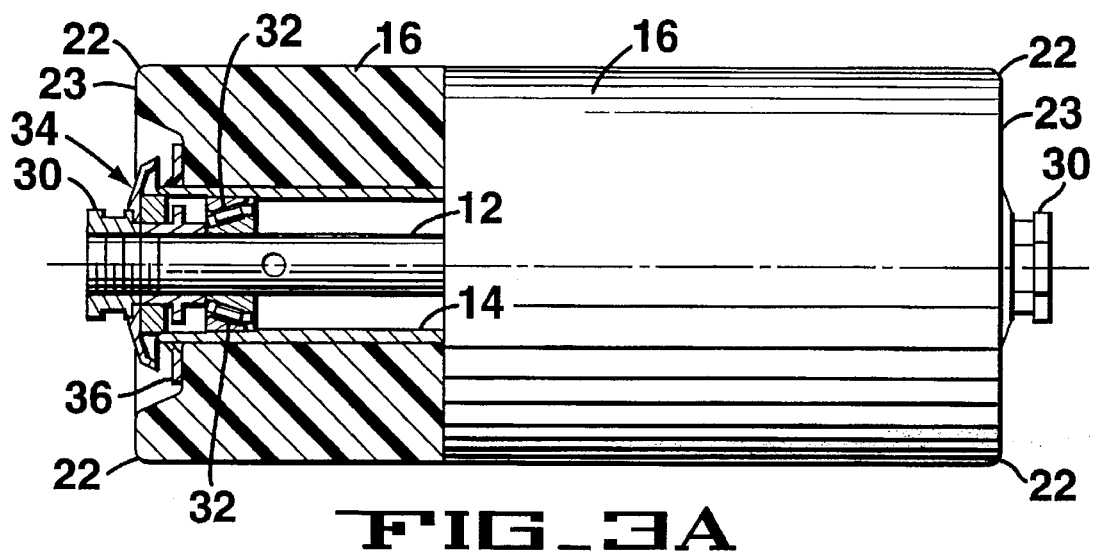
FIG_3A
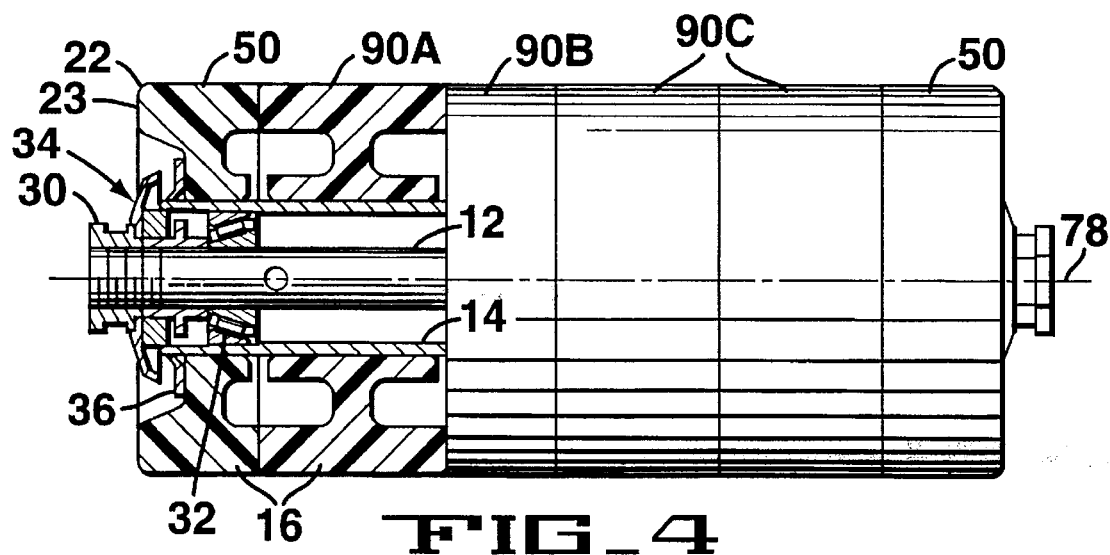
FIG_4
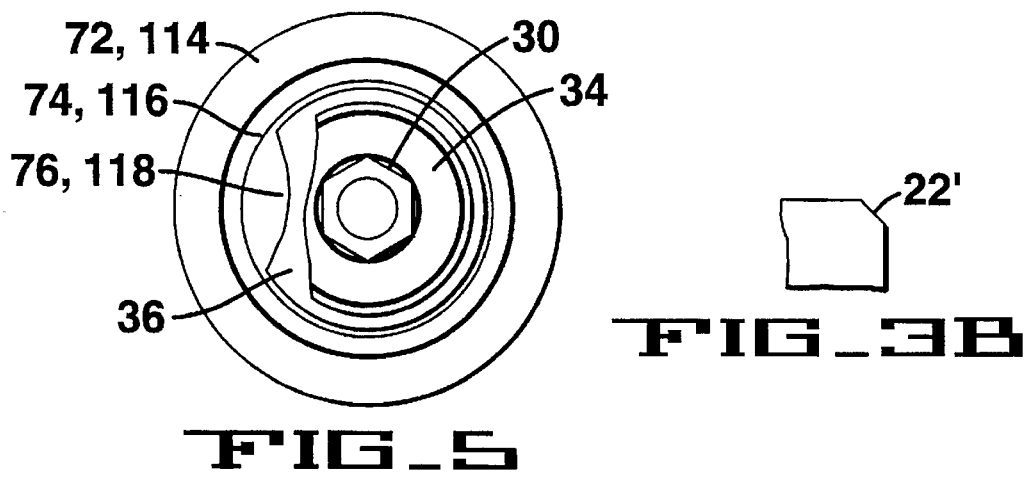
FIG_5
FIG_3B

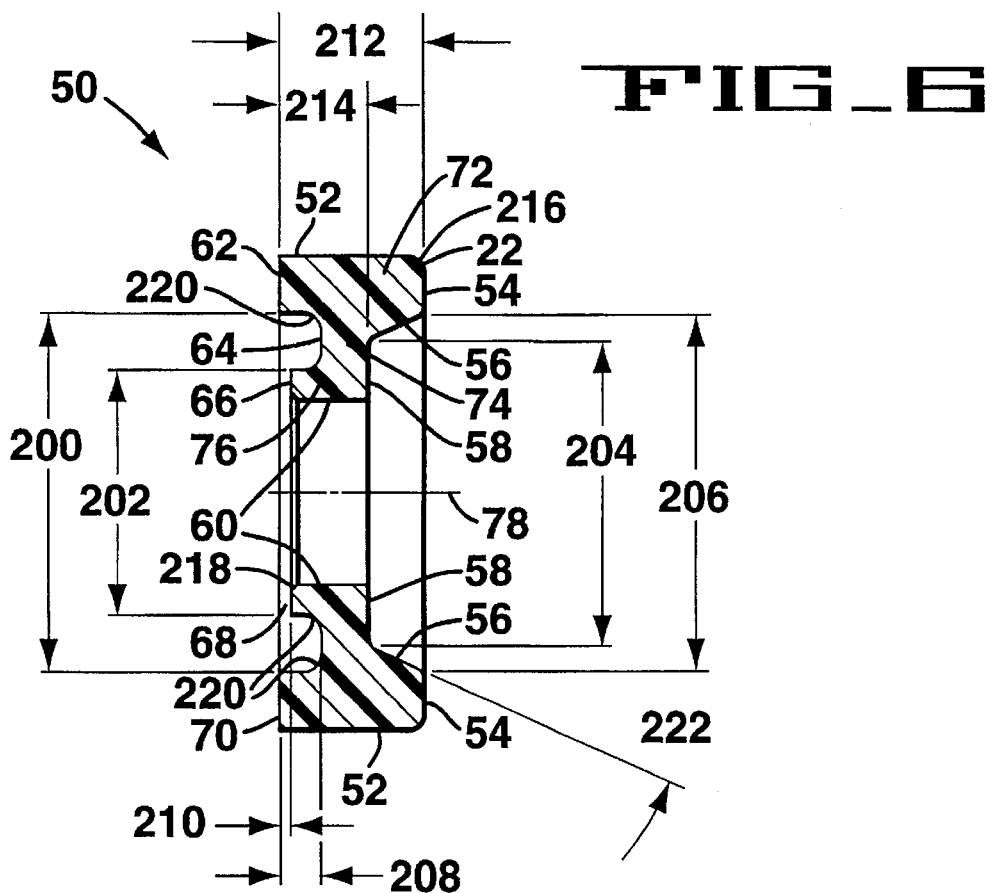
FIG_6
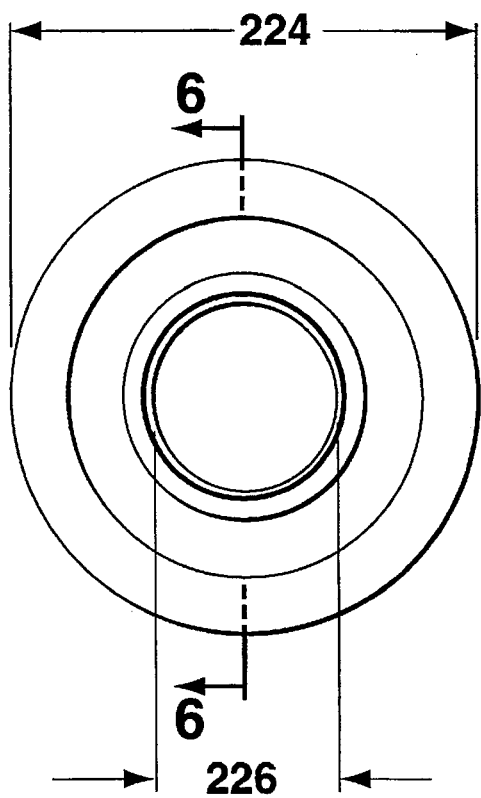
FIG_7

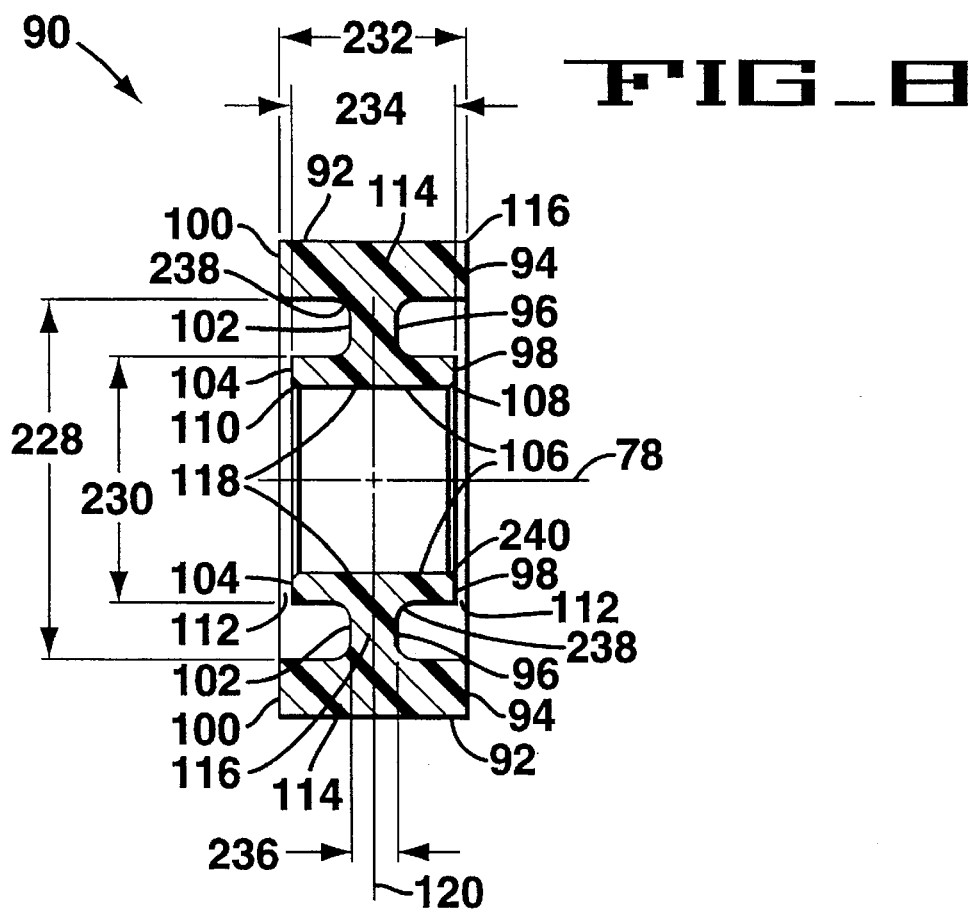
FIG_8
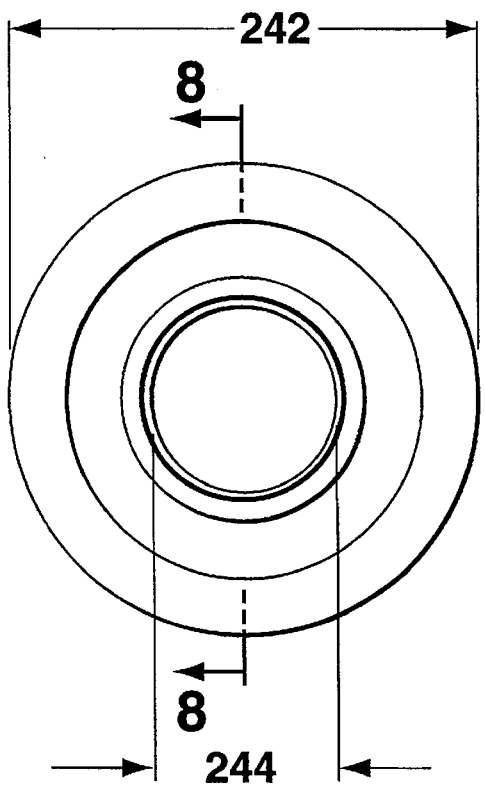
FIG_9

IDLER ROLL FOR USE IN BELT CONVEYOR SYSTEMS

BACKGROUND OF THE INVENTION

1. Field of the Invention

This invention relates to idler rolls and more particularly to idler rolls used in belt conveyor systems.

2. Description of Related Art

Idler rolls are typically used in belt conveyor systems for handling bulk material, such as coal, sand, widgets, and the like. As is known in the art, a series of idler rolls may be arranged in a u-shaped fashion having a conveyor disposed thereon for carrying bulk material. For example, a first idler roll may be aligned along a horizontal direction and a second and a third idler roll may extend at an angle (i.e., 30 to 45 degrees) in the same plane as the first idler roll, forming a u-shaped configuration. A plurality of these first, second, and third idler rolls may be arranged along the desired path for moving the bulk material. When a conveyor is disposed above the plurality of idler rolls, the u-shaped configuration helps prevent the spillage of the bulk material from the conveyor itself.

Prior art idlers have been formed with steel rolls. That is, a steel roll is placed around a center shaft forming the steel idler roll. Steel idler rolls, however, tend to allow build-up of material on the roll especially where the material being transported is sticky in nature. In addition, steel idler rolls may wear faster when the materials being transported are abrasive substances.

To help overcome the disadvantages of steel idler rolls, idler rolls have also been formed with an extruded polyethylene shell. Referring to FIG. 1, there is shown an idler roll 10 having a steel shaft 12 and steel shell 14. A polyethylene shell 16 is disposed around the steel shaft 12 and shell 14 by the use of polyethylene disks 18 at each end of the idler roll 10. Air gap 20 is present in the region between the polyethylene disks 18, the steel shell 14 and the polyethylene shell 16. Because the polyethylene shell is extruded, it may be necessary to add an additional processing step of smoothing the exterior surface of the polyethylene shell 16 by a turning or smoothing operation. This adds increased manufacturing costs. In addition, because the disks 18 are disposed on each end of the idler roll 10, an absence of load support may result in the central region of the idler roll (i.e., in the location of the air gap 20).

Prior art idler rolls typically are designed having a certain length for a given application. For example, idler rolls varying in size from about a half-a-foot to about six feet are typically used for conveying bulk material. Thus, a plurality of different sized idler rolls would have to be made having varying size shells 16 to cover all of the desired lengths required. In the past, idler rolls have been formed by combining a plurality single size polyethylene shells onto a steel shell and shaft to form a larger idler roll. However, it is desirable to have flexibility to create an idler roll of a given size based upon a series of modular sections which may vary in length. This would allow for the building of an idler roll whose length is not an integral multiple of the single size polyethylene shell. Such flexibility would allow for incremental differences in the sizes of idler rolls desired. As a result, the use of modular sections may allow for less parts for forming an idler roll of a desired length to be housed.

Because typical prior art polyethylene idler rolls are formed by placing an extruded polyethylene shell on a steel shell, they have edges 22 which are perpendicular in cross section. When the u-shaped configuration noted above is formed, there may be a sharp contact point between two adjacent idler rolls and the conveyor belt disposed thereon. These sharp points may lessen the life of the conveyor belt. Therefore, it is desirable to have a polyethylene idler roll which does not have perpendicular edges for affecting the life of the conveyor belt placed thereon.

SUMMARY OF THE INVENTION

There is provided an idler roll for use in belt conveyor systems comprising a shaft and at least two modular sections disposed adjacent to one another surrounding the shaft, the at least two modular sections varying in thickness as measured along an axis of the shaft.

There is also provided an idler roll for use in belt conveyor systems comprising a shaft and a molded polymer coating disposed around the shaft, wherein the coating is at least partially tapered in cross section at each end of the idler roll.

There is further provided a belt conveyor system for handling bulk material comprising a plurality of idler rolls arranged along a given direction and a conveyor belt disposed on the plurality of idler rolls, wherein each of the plurality of idler rolls comprises a shaft and at least two modular sections formed of polymer material disposed adjacent to one another, the at least two modular sections varying in thickness as measured along an axis of the shaft, the modular sections surrounding the shaft.

BRIEF DESCRIPTION OF THE DRAWINGS

FIG. 1 is a front elevation view of a prior art polyethylene idler roll with a partial cutaway view of the interior portions of the idler roll.

FIG. 2 is a perspective view of a bulk material handling system in accordance with the principles of the present invention with a portion of the conveyor belt removed for purposes of illustration.

FIG. 3A is a front elevation view of an idler roll in accordance with a first preferred embodiment of the present invention with a partial cutaway view of the interior portion of the idler roll and FIG. 3B shows an enlarged view of an alternative tapered edge.

FIG. 4 is a front elevation view of an idler roll in accordance with a second preferred embodiment of the present invention with a partial cutaway view of the interior portion of the idler roll.

FIG. 5 is a side elevation view of the idler roll of FIG. 4.

FIG. 6 is a cross-sectional view of the end modular section of FIG. 4.

FIG. 7 is a side elevation view of the end modular section of FIG. 6.

FIG. 8 is a cross-sectional view of the central modular section of FIG. 4.

FIG. 9 is a side elevation view of the central modular section of FIG. 8.

FIG. 10 is a partial cross sectional view of the steel shell used in the present invention.

DESCRIPTION OF THE PREFERRED EMBODIMENTS

Referring to FIG. 2, there is shown a conveyor system for bulk material handling 2 in accordance with the principles of the present invention. Similar items have been labeled similarly for purposes of clarity. A plurality of idler rolls 10A, 10B, and 10C are aligned along a given plane forming a u-shaped configuration. Each of the idler rolls 10A, 10B, and 10C are connected by grease tubes 13, as is standard in the industry. As is also standard in the industry, the idler rolls are connected to a supporting structure or base angles 15 by the use of end brackets 17 and center brackets 19. Further, a conveyor belt 21 may be disposed upon the idler rolls for conveying bulk material.

Referring also to FIG. 3A, there is shown an idler roll formed in accordance with a first preferred embodiment of the present invention. In this embodiment, a polyethylene shell or coating 16 is disposed around a shaft 12 and steel shell 14. Preferably the polyethylene material used is a high density polyethylene, such as polyethylene material number 04452N manufactured by General Polymers. However, other suitable polymer materials may also be used.

As is standard in the industry, an adjusting nut 30 is provided at each end of the idler roll 10. Bearing assemblies 32, which may be tapered roller bearings, are also provided at each end of the idler roll 10. The adjusting nut 30 sets the pre-loading of the tapered roller bearing assemblies 32. The bearing assemblies 32 allow for rotation of the idler roll 10 and transmit the load from the polyethylene shell 16 to the shaft 14. A seal assembly 34 is further provided to help protect the bearing assemblies 32 from contaminants. The seal assembly 34 may be a triple labyrinth seal assembly. A locking press ring 36 may be employed to lock the polyethylene shell 16 in place. Preferably, the locking press ring 36 is formed of steel.

Referring also to FIG. 10, there is shown a partial cross sectional view of the steel shell 14. The details of the opposing end of the steel shell 14 are similar to the end shown. The central portion 40 of the steel shell 14 preferably is the thickest in cross section. The portion 42 of the steel shell 14 disposed around the bearing assembly 32 is preferably slightly smaller in cross section than the central portion 40. Further, the end portion 44 of the steel shell 14 is preferably slightly smaller in cross section than portion 42, allowing for insertion of the seal assembly 34. A chamfer 46 may be located at the edges of the end portion 44. The steel shell 14 may be symmetric about center line 246.

Referring back to FIG. 3A, the edges 22 of the idler roll 10 are tapered in cross section. Preferably, the tapering results in a curved cross section, as shown in FIG. 3A. The radius of curvature of the edges may be such that the ends 23 do not have a substantially flat surface. Preferably, however, the radius of curvature is 0.12 inches. Alternatively, the edges may taper by providing an edge 22' as shown in FIG. 3B. By having edges 22 which are tapered or curved in cross section, there may no longer be a sharp contact point between two adjacent idler rolls, such as idler rolls 10A and 10C of FIG. 2. As a result, the life of the conveyor belt 21 may be extended. Further, the curved edges 22 may help shed material which may otherwise build up if the edges were perpendicular in cross section.

Referring now to FIG. 4, there is shown a second preferred embodiment of the present invention. The second preferred embodiment differs from the first preferred embodiment in that a plurality of modular sections of the polyethylene shell, to be described, are provided rather than a single piece of material.

Referring also to FIGS. 6 and 7, there is shown an end modular section 50 having a curved edges 22. A given end modular section 50 has an exterior 40 upper surface 52 and exterior side surfaces 54, 56, and 58. The end modular section 50 further has an inner surface 60 which is disposed against the steel shell 14. Moreover, an interior surface is comprised of surfaces 62, 64, and 66. Further, a chamfer is located between surface 66 and surface 60. Preferably, the inner surface is shorter in length than the end 70 of the exterior surface by a distance 68, as measured along an axis 78 of the shaft.

The general region disposed between surface 62 and 54 may be referred to as the shell 72. The region disposed between the surface 64 and the surfaces 56 and 58 may be referred to as the web 74. Further, the region disposed between the surface 66 and 58 may be referred to as the hub 76. Preferably, the thickness of the shell 72 is greater than the thickness of the hub 76 as measured along the axis 78 of the shaft. Further, preferably the thickness of the hub 76 is greater than the thickness of the web 74 as measured along the axis 78 of the shaft.

Referring to FIG. 8, there is shown a central modular section 90. The central modular section may vary in length as measured along the axis of the shaft as will be described. As noted in FIG. 4, the central modular section 90 is provided with a suffix of A, B, and C to denote the varying sizes of the modular section 90.

A given central modular section 90 has an exterior upper surface 92 and side surfaces 94, 96, 98 and 100, 102, 104, as shown. The end-modular section 90 further has an inner surface 106 which is disposed against the steel shell 14. Further, a first chamfer 108 is located between surface 106 and surface 98 and a second chamfer 110 is located between surface 106 and surface 104. Preferably, the inner surface 106 is shorter in length than the exterior upper surface 92 by a distance 112 at each end, as measured along the axis 78.

As seen from FIG. 8, the central modular section 90 has a cross section which is I-shaped. Preferably the dimensions of the central modular section 90 are symmetric about a central axis 120. The general region disposed between surface 100 and 94 may be referred to as the shell 114. The region disposed between the surface 102 and the surface 96 may be referred to as the web 116. Further, the region disposed between the surface 104 and 98 may be referred to as the hub 118. Preferably, the thickness of the shell 114 is greater than the thickness of the hub 118 as measured along the axis 78 of the shaft. Further, preferably the thickness of the hub 118 is greater than the thickness of the web 116 as measured along the axis 78 of the shaft.

The cross section of the hub 118 is less than that of the shell 114 so that the surfaces 92 of the shells 114 of adjacent modular sections 90A, 90B, and 90C are flush with one another when the modular sections are connected to one another, as shown in FIG. 4. Similarly, the cross section of the hub 76 of the end modular section 50 is less than the shell 72 of the end modular section 50 so that the surface 52 of the shell 72 and the surface 92 of the shell 114 of the central modular section 90 are flush with one another when connected.

An example of the dimensions of a five inch diameter idler roll 10 constructed in accordance with a preferred embodiment of the invention are shown in FIGS. 6 through 9. Referring to FIGS. 6 and 7, the dimensions for the end modular section 50 may be the following: dimension 200 is 3.75 inches, dimension 202 is 2.50 inches, dimension 204 is 3.23 inches, dimension 206 is 3.75 inches, dimension 208 is 0.44 inches, dimension 210 is 0.12 inches, dimension 212 is 1.50 inches, dimension 214 is 0.94 inches, dimension 216 is a 0.12 inch radius, dimension 218 is a 0.06 inch×45 degree chamfer, dimension 220 is a 0.25 inch radius, dimension 222 is 0.25 degrees, dimension 224 is 5.00 inches and dimension 226 is 1.94 inches. Further, the dimensions for the central modular section 90C, as illustrated in FIG. 4, are referred to in FIGS. 8 and 9. Specifically, the dimensions for the central modular section 90C may be the following: dimension 228 is 3.75 inches, dimension 230 is 2.50 inches, dimension 232 is 2.00 inches, dimension 234 is 1.75 inches, dimension 236 is 0.50 inches, dimension 238 is a 0.25 inch radius, dimension 240 is a 0.06 inch×45 degree chamfer, dimension 242 is 5.00 inches, and dimension 244 is 1.94 inches. The dimensions for central modular sections 90A and 90B are preferably the same as that of central modular section 90C except that the dimensions for the width of the hub 98 and shell 94 may vary. For example, for modular section 90B, the length of surface 92 as measured along axis 78 may be 1.38 inches instead of 2.00 inches and the length of surface 106 may be 1.12 inches instead of 1.75 inches. Further, for modular section 90A, the length of surface 92 may be 2.25 inches instead of 2.00 inches and the length of surface 106 may be 2.00 inches instead of 1.75 inches. A plurality of the modular sections 90 may be arranged to provide a idler roll 10 of the desired length. For example, lengths from a half-a-foot to six feet or larger may be achieved in accordance with the principles of the present invention.

As to the dimensions of the steel shell 14, for a 2 inch diameter steel shell 14, the cross section of central portions 40, 42, and 44 may be 0.156 inches, 0.1115 inches, and 0.098 inches, respectively, as shown in FIG. 10. Further, the length of portion 44 is preferably 0.656 inches to properly allow for the insertion of the seal assembly 34. Moreover, the length of portion 42 is preferably 0.633 inches to allow for the insertion of the bearing assembly 32. The length of the central portion 40 depends upon the size of the idler roll 10 desired by the user. That is, length of the central portion 40 is the desired length of the idler roll 10 minus two times the value of both the length of the portions 42 and 44. In addition, the chamfer 46 may be a 0.06 by 30 degree chamfer.

Preferably, the outer diameter of the steel shell 14 is slightly larger than the inner diameter of the modular sections (i.e., the length between inner surfaces 60 of the end modular section 50 or inner surfaces 106 of the central modular section 90). For example, where the steel shell outer diameter is two inches, the inner diameter is preferably 1.94 inches. This allows for an interference fit between the modular sections and the shaft.

Although three different width sizes for the central modular sections 90 have been described, any number of central modular section 90 configurations may be used to build the desired idler roll (i.e., four, five, or ten or more different configurations). Moreover, although a five inch diameter idler roll has been shown for purposes of illustration, idler rolls having a different diameter may easily be constructed by increasing, for example, the length of the web portion along the axis 120 where an idler roll having a greater diameter is desired.

Further, the webs 74 and 116 provide load support for the respective shells 72 and 114. As a result, the webs 74 and 116 help to prevent the deformation of the shells 72 and 114 which may otherwise result from loads provided to the idler roll 10. Referring also to FIGS. 4 and 5, preferably the shells 72, 114, the webs 74, 116, and hubs 76, 118 of the end modular section 50 and central modular section 90, respectively, have similar dimensions as measured along an axis transverse the shaft axis 78. The hubs 76, 118 provide support for the shells 72, 114 via webs 74, 116.

The modular sections 50 and 90 are injection molded pads. The modular sections 50 and 90 are placed on the steel shell 14 by the use of large hydraulic cylinder, such as a hydraulic cylinder manufactured by Thomkins-Johnson having a 5 inch bore, a 3 inch rod, and a 128 inch stroke, the stroke being mounted horizontally rather than vertically. The hydraulic cylinder force fits the modular sections onto the steel shell. After the modular sections have been force fitted, the bearing assembly 32, locking press ring 36, seal assembly 34, and adjusting nut 30 may be assembled. The locking press ring 36 may be formed of steel and helps to ensure that the modular sections 50, 90 are secured in place.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. An idler roll for use in belt conveyor systems handling bulk material comprising:

a shaft;

two end sections surrounding said shaft; and at least two modular sections disposed adjacent to one another and between said two end sections, said at least two modular sections surrounding said shaft;

said at least two modular sections being of different thickness as measured along an axis of said shaft, and said at least two modular sections having a substantially flat exterior surface;

wherein there is an interference fit between said at least two modular sections and said shaft.

2. The invention of claim 1 comprising a first modular section disposed around one end of said shaft, a second modular section disposed around an opposing end of said shaft, and a third modular section disposed between said first modular section and said second modular section, said second modular section comprising a hub disposed on said shaft, a shell, and web disposed between said hub and said shell, said web being smaller in thickness than said shell and said hub as measured along an axis of said shaft.

3. The invention of claim 2 wherein said hub is smaller in thickness than said shell as measured along said axis.

4. The invention of claim 1 wherein said idler roll comprises a plurality of modular sections, at least three of said plurality of modular sections varying in thickness as measured along an axis of said shaft.

5. The invention of claim 1 comprising a first modular section disposed around one end of said shaft and a second modular section disposed around an opposing end of said shaft, each of said first and second modular sections being at least partially curved in cross section at each end of said idler roll.

6. The invention of claim 5 further comprising a press ring, wherein said first and second modular sections comprise a hub disposed on said shaft, a shell, and web disposed between said hub and said shell, said web being smaller in thickness than said shell and said hub as measured along an axis of said shaft and said press ring is disposed against said hub and at least a portion of said web along an exterior portion of said first and second modular sections.

7. The invention of claim 1 wherein each of said modular sections comprises premolded polyethylene material.

8. A belt conveyor system for handling bulk material comprising:

a plurality of idler rolls arranged along a given direction; and a conveyor belt disposed on said plurality of idler rolls;
wherein each of said plurality of idler rolls comprises a shaft, two end sections surrounding said shaft, and at least two modular sections formed of polymer material disposed adjacent to one another and between said two end sections, said at least two modular sections being of different thickness as measured along an axis of said shaft, said at least two modular sections having a substantially flat exterior surface, and said at least two modular sections surrounding said shaft and having an interference fit with said shaft.

9. The invention of claim 15 wherein each of said plurality of idler rolls comprises a first modular section disposed around one end of said shaft, a second modular section disposed around an opposing end of said shaft, and a third modular section disposed between said first modular section and said second modular section, said second modular section comprising a hub disposed on said shaft, a shell, and web disposed between said hub and said shell, said web being smaller in thickness than said shell and said hub as measured along an axis of said shaft.

10. The invention of claim 9 wherein said hub is smaller in thickness than said shell as measured along said axis.

11. The invention of claim 8 wherein said modular sections comprises polyethylene.

12. The invention of claim 8 wherein each of said plurality of idler rolls comprises a first modular section disposed around one end of said shaft and a second modular section disposed around an opposing end of said shaft, each of said first and second modular sections being at least partially curved in cross section at each end of said idler roll.

* * * * *